Aug. 17, 1965   L. W. A. MEYER   3,201,505
PROCESS FOR MOLDING ROD-LIKE CIGARETTE FILTER
TIP OF CELLULOSE ESTER FLAKE
Filed May 24, 1962
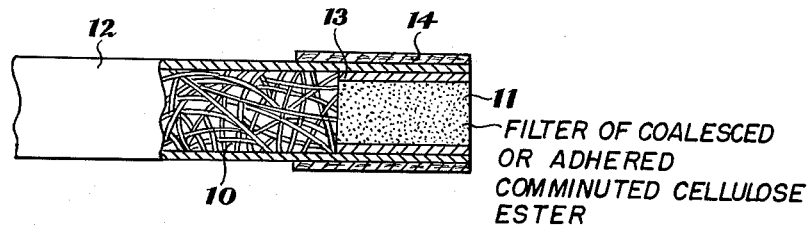
FILTER OF COALESCED
OR ADHERED
COMMINUTED CELLULOSE
ESTER
Lester W.A. Meyer
INVENTOR.
BY
ATTORNEYS

United States Patent Office 3,201,505
Patented Aug. 17, 1965

3,201,505
PROCESS FOR MOLDING ROD-LIKE CIGARETTE FILTER TIP OF CELLULOSE ESTER FLAKE
Lester W. A. Meyer, Kingsport, Tenn., assignor to Eastman Kodak Company, Rochester, N.Y., a corporation of New Jersey
Filed May 24, 1962, Ser. No. 197,305
8 Claims. (Cl. 264—109)

This application is a continuation-in-part of my application Serial No. 456,534, filed on September 16, 1954, and now abandoned.

This invention relates to filters, particularly for use with tobacco smoke, and more particularly to filters made up of flake or powdered cellulose esters bound together by various cementing or coalescing media to form a rigid, coarse filter structure.

It is well known that various smoking products, such as cigarettes, are the source of a number of substances which may pass into the mouth of the user, the substances including nicotine and tarry matter. It has been proposed to interpose various types of filters between the tobacco and the smoker's mouth, and among the substances which have been proposed and used successfully in such filters are the cellulose esters, particularly cellulose acetate. In the case of cigarettes, such filters have been permanently mounted on the tobacco portion of the cigarette, and means for attaching filters to cigarettes are well known.

It is an object of my invention to provide a novel type of rod-like element, for example, for use with cigarettes as a tip or filter, which element is made up of a powdered or flake cellulose ester, such as cellulose acetate, formed into a rigid, coarse mass by certain preferred types of cementing or coalescing media selected from the following types:

(1) The cementing media may comprise various monomers which are polymerized by heating, such as methyl methacrylate, vinyl acetate and allyl phthalate;

(2) The cementing media may comprise partially polymerized resins which undergo further polymerization under heating, such as urea formaldehyde resins, polyester resins, and epoxy compounds;

(3) The cementing or coalescing media may comprise organic esters which become solvents on heating, or which increase in solvent activity at elevated temperatures, for example, dimethyl phthalate, diethyl phthalate, methyl phthalyl ethyl glycollate, glyceryl triacetate, and dimethoxyethyl phthalate.

These and other objects of the invention will be apparent from study of the following specifications, when considered in connection with the attached drawing in which the figure shows, partly in elevation and partly in longitudinal section, a cigarette provided with a filter tip made in accordance with the present invention.

In the drawing, I have shown a cigarette 10 having attached to one end thereof in the usual manner a filter 11 made of cellulose ester flake or powder adhered or coalesced together in accordance with the invention. This filter may or may not be wrapped in a separate paper as shown at 13. The filter may be attached to the cigarette in any suitable manner, and I have shown in the drawing cigarette paper 12 surrounding both the tobacco and the filter, and a cork or other tip surrounding the paper 12 in the region of the tip.

The filter is preferably made of flake cellulose ester, the flake being of open fibrous structure and up to one-fourth inch in length. Powdered cellulose ester having a particle size of 10 to 100 mesh may also be used. This flake may be hammer milled to improve its processability. Various of the cellulose esters may be used, including the mixed esters, but I prefer to use cellulose acetate having an acetyl value in the range of 31% to 44% and preferably 37.5% to 41.0%. Although the several types of cementing or coalescing media referred to above may be used with the flake or powder, I prefer to use the esters described under 3 above. I will now set forth specific working examples showing how the invention may be carried out in actual practice.

Example I

Hammer mill flake having a length up to 3/16 inch and a very open structure is mixed with vinyl acetate containing about 0.5% benzoyl peroxide in proportion to the vinyl acetate. Various amounts of the flake and the vinyl acetate-benzoyl peroxide mixture are useful, for example, the following provide successful results:

(1) 2 parts of vinyl acetate-benzoyl peroxide mixture by weight and 1 part of flake acetate.
(2) 2.9 parts of vinyl acetate-benzoyl peroxide mixture to 1 part of flake acetate.
(3) 5 parts of vinyl acetate-benzoyl peroxide mixture to 1 part of acetate flake.

After mixing the components listed above, they can be compacted into a molding tube and subjected to heating for up to 48 hours at about 160° F., followed by removal of the mold and cutting of the molded, cylindrical product into suitable lengths of filter, or the vinyl acetate-benzoyl peroxide can be sprayed onto the flake and the flake then fed to a cigarette machine in which it would be wrapped in paper and shaped by passage through forming dies in the garniture, after which the product is heated and then severed into desired lengths of filter.

Example II

Cellulose acetate flake or powder is sprayed with dimethyl phthalate or other suitable plasticizer containing a volatile diluent such as acetone. The diluent not only permits the ester to spray better but the diluent can be one which can cause bonding action. Preferably the proportions are of about three-fourths dimethyl phthalate and one-fourth diluent. The thus sprayed cellulose acetate is placed in a cylindrical mold and heated to form a rigid filter structure. The cellulose acetate thus treated can also be formed into filters by rolling in a cigarette machine.

Example III

Cellulose acetate flake or powder is sprayed with methyl methacrylate monomer, or prepolymer, catalyzed with about 1% benzoyl peroxide. The thus treated cellulose acetate is fed to a cigarette machine where it is rolled into cylinders encased in cigarette paper or other media. The cylinders are then heated at a temperature of about 160° F. for two hours to effect the bonding. The cylinders are then cut into the desired lengths for use as filters.

Example IV

Cellulose acetate flake or powder precipitate is sprayed with a solution of urea formaldehyde catalyzed with a suitable catalyst. The resin reformite F-240, 60% solids, gives excellent results when thinned to 30% solids with toluene and catalyzed with 1% maleic acid. The thus treated cellulose acetate is rolled into filters as previously described or placed in a cylindrical mold. After subjecting the filters to a temperature of approximately 160° F. for two hours to effect bonding, they are severed into desired lengths.

Example V

Cellulose acetate flake or powder precipitate is sprayed with triacetin, placed in a cylindrical tube or rolled into filters, as previously described, and heated at an elevated temperature of about 160° F. for two hours to effect bonding. Then the prepared filters are cut into desired lengths.

As indicated above, I prefer to use a process as illustrated by this last example wherein an ester is applied to the flake. Such esters are not only rapid acting but are reasonably free from vapors or fumes such as may be present when using certain liquid solvents. After the flake having the ester thereon is slightly heated or is stored for a period, suitable bonding is accomplished and the resultant filter tip has no objectionable residual odor or the like. Also, the use of my ester treating process is advantageous industrially in not requiring a solvent recovery system or special safety provisions which are needed when handling large amounts of volatile solvents.

Although the invention has been described in considerable detail with particular reference to certain preferred embodiments thereof, variations and modifications can be effected within the spirit and scope of the invention as described hereinabove, and as defined in the appended claims.

I claim:

1. A process for the production of rod-like elements which may be used for cigarette filter tips which comprises the steps of treating particles of cellulose acetate with a relatively non-volatile material from the group consisting of heat sensitive monomers, partially polymerized polymers and organic esters having solvent action on said cellulose acetate, shaping the cellulose acetate thus treated into the desired rod-like element form, heating the form to cause the non-volatile material to further act on the cellulose acetate and severing the rod into desired lengths.

2. A process in accordance with claim 1 wherein the non-volatile material is an organic ester from the group consisting of dimethyl phthalate, diethyl phthalate, methyl phthalyl ethyl glycollate, glyceryl triacetate and dimethoxyethyl phthalate.

3. The process for the production of rod-like elements which may be used for cigarette filter tips which comprise spraying cellulose acetate flake with an organic ester which has solvent and bonding action on the flake, rolling the flake thus sprayed into the form of a rod, subjecting the rod to heating conditions sufficient to activate the ester and form a rigid rod.

4. The process of claim 3 wherein the ester is mixed with a diluent to facilitate the spraying.

5. The process in accordance with claim 1 wherein a monomer is applied to the cellulose acetate and the monomer also has incorporated in the presence thereof a polymerization catalyst selected from the group consisting of benzoyl peroxide and maleic acid whereby the monomer by an application of heat may be caused to bond the cellulose acetate particles.

6. The process of claim 1 wherein the cellulose acetate is in flake form.

7. The process of claim 1 wherein the cellulose acetate particles comprise hammer milled flake.

8. A process in accordance with claim 1 wherein the cellulose acetate has an acetyl value of 31-44%.

References Cited by the Examiner

UNITED STATES PATENTS

| | | | |
|---|---|---|---|
| 2,806,474 | 9/57 | Yarsley | 264—148 |
| 2,881,769 | 4/59 | Toney | 131—10 |
| 2,923,034 | 2/60 | Dickie et al. | 18—48 |
| 2,999,004 | 9/61 | Morse | 18—54 |
| 3,126,009 | 3/64 | Mahoney et al. | 131—10 |

ALEXANDER H. BRODMERKEL, *Primary Examiner.*

MELVIN D. REIN, *Examiner.*